(12) United States Patent
Enomoto

(10) Patent No.: US 6,618,558 B2
(45) Date of Patent: Sep. 9, 2003

(54) ZOOM LENS SYSTEM

(75) Inventor: Takashi Enomoto, Chiba (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/225,294

(22) Filed: Aug. 22, 2002

(65) Prior Publication Data

US 2003/0049026 A1 Mar. 13, 2003

(30) Foreign Application Priority Data

Aug. 31, 2001 (JP) ......................................... 2001-262753

(51) Int. Cl.⁷ ........................... G03B 17/00; G02B 15/16
(52) U.S. Cl. .......................................... 396/72; 359/692
(58) Field of Search ....................... 396/72, 79; 359/692

(56) References Cited

U.S. PATENT DOCUMENTS

| | | | |
|---|---|---|---|
| 5,663,838 A | 9/1997 | Hasushita et al. | 359/692 |
| 5,687,028 A | 11/1997 | Ito | 359/692 |
| 5,930,052 A | 7/1999 | Enomoto et al. | 359/692 |
| 6,072,638 A | 6/2000 | Enomoto | 359/692 |
| 6,268,965 B1 | 7/2001 | Enomoto | 359/692 |
| 6,297,914 B1 | 10/2001 | Enomoto | 359/692 |

FOREIGN PATENT DOCUMENTS

| | | | |
|---|---|---|---|
| JP | 6-347696 | 12/1994 | ........... G02B/15/16 |
| JP | 11-84236 | 3/1999 | ........... G02B/15/16 |

*Primary Examiner*—W. B. Perkey
(74) *Attorney, Agent, or Firm*—Greenblum & Bernstein, P.L.C.

(57) ABSTRACT

Zoom lens system includes a positive first lens group, and a negative second lens group. Zooming is performed by moving the positive first lens group and the negative second lens group in an optical axis direction. The positive first lens group includes a negative first lens element, a second lens element having an aspherical surface on which the curvature is smaller toward the periphery thereof, and a positive third lens element. The negative second lens group includes a positive fourth lens group and a negative fifth lens group. The zoom lens system satisfies the following conditions:

$$-7 < f_T/f_{2G} < -4.5$$

$$-9 < f_T/f_{2GN} < -7$$

wherein $f_T$ designates the focal length of the entire zoom lens system at the long focal length extremity;

$f_{2G}$ designates the focal length of the negative second lens group, and $f_{2GN}$ designates the focal length of the fifth lens element in the negative second lens group.

9 Claims, 7 Drawing Sheets

Fig.1
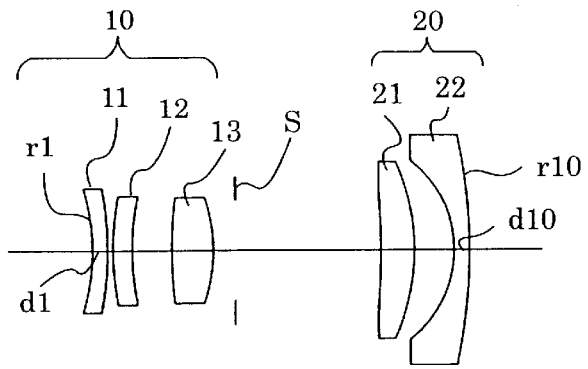
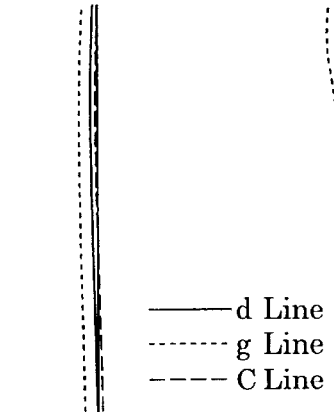
Fig.2A
$F_{NO.}=5.6$
—— d Line
------ g Line
---- C Line
-1.0   1.0
SPHERICAL
ABERRATION
CHROMATIC
ABERRATION
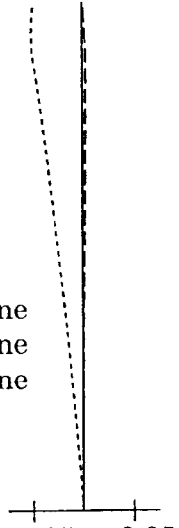
Fig.2B
W=28.2
-0.05   0.05
LATERAL
CHROMATIC
ABERRATION
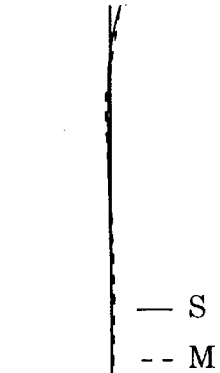
Fig.2C
W=28.2
— S
-- M
-1.0   1.0
ASTIGMATISM
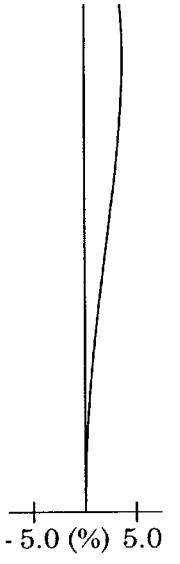
Fig.2D
W=28.2
-5.0 (%) 5.0
DISTORTION

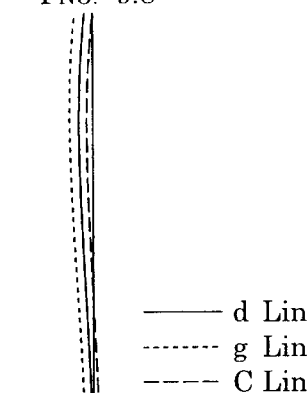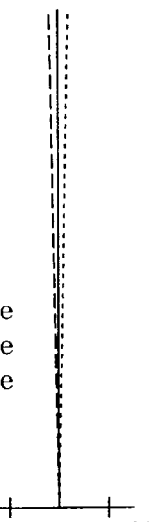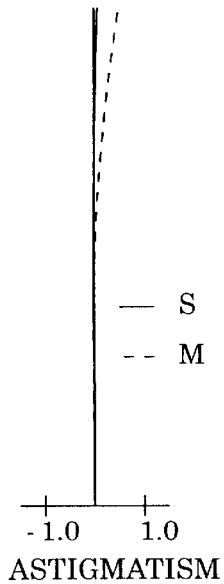
Fig.3A  Fig.3B  Fig.3C  Fig.3D
F$_{NO.}$=9.8  W=17.0  W=17.0  W=17.0
SPHERICAL ABERRATION
CHROMATIC ABERRATION
LATERAL CHROMATIC ABERRATION
ASTIGMATISM
DISTORTION
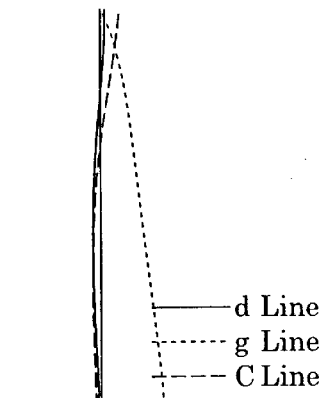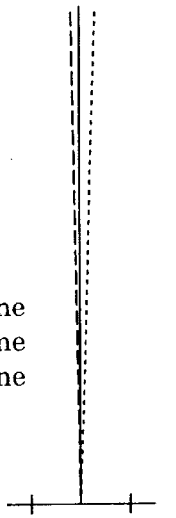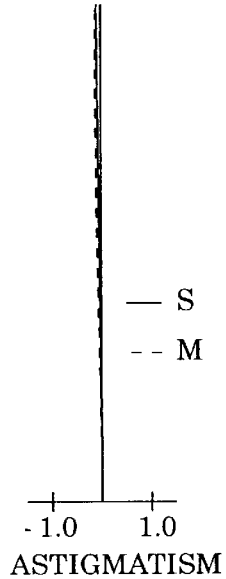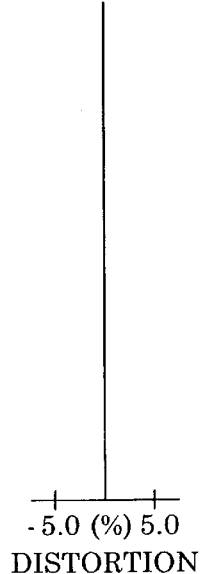
Fig.4A  Fig.4B  Fig.4C  Fig.4D
F$_{NO.}$=13.2  W=10.2  W=10.2  W=10.2
SPHERICAL ABERRATION
CHROMATIC ABERRATION
LATERAL CHROMATIC ABERRATION
ASTIGMATISM
DISTORTION Fig.5
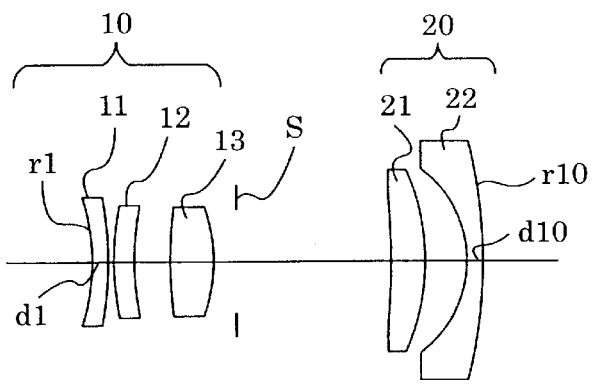
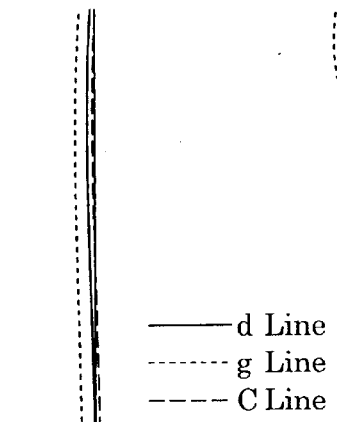
Fig.6A
FNO.=5.6
———— d Line
········ g Line
———— C Line
-1.0  1.0
SPHERICAL
ABERRATION
CHROMATIC
ABERRATION
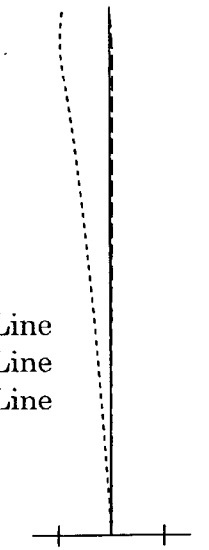
Fig.6B
W=28.2
-0.05  0.05
LATERAL
CHROMATIC
ABERRATION
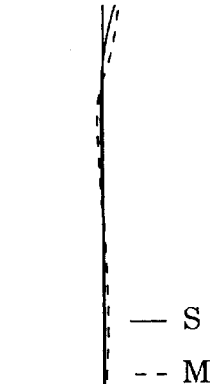
Fig.6C
W=28.2
— S
-- M
-1.0  1.0
ASTIGMATISM
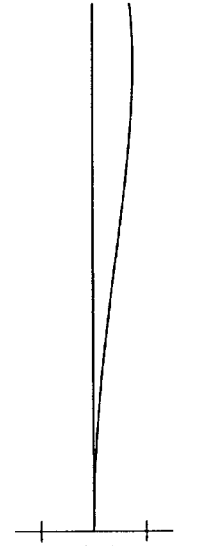
Fig.6D
W=28.2
-5.0 (%) 5.0
DISTORTION

FNO.=9.8

—— d Line
······· g Line
- - - C Line

-1.0  1.0
SPHERICAL
ABERRATION

CHROMATIC
ABERRATION

W=17.0

-0.05  0.05
LATERAL
CHROMATIC
ABERRATION

W=17.0

—— S
- - M

-1.0  1.0
ASTIGMATISM

W=17.0

-5.0 (%) 5.0
DISTORTION

FNO.=13.2

—— d Line
······· g Line
- - - C Line

-1.0  1.0
SPHERICAL
ABERRATION

CHROMATIC
ABERRATION

W=10.2

-0.05  0.05
LATERAL
CHROMATIC
ABERRATION

W=10.2

—— S
- - M

-1.0  1.0
ASTIGMATISM

W=10.2

-5.0 (%) 5.0
DISTORTION

Fig.9
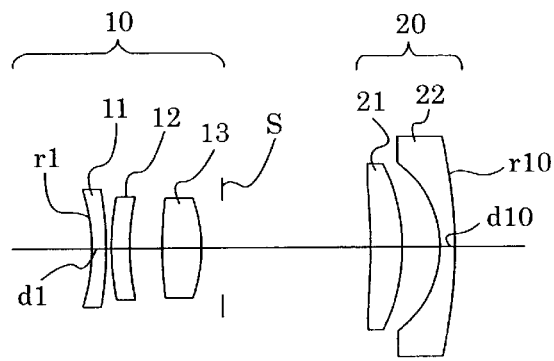
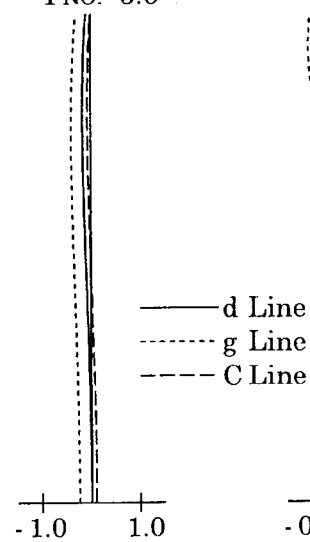
Fig.10A
FNO.=5.6
———— d Line
······· g Line
---- C Line
-1.0  1.0
SPHERICAL
ABERRATION
CHROMATIC
ABERRATION
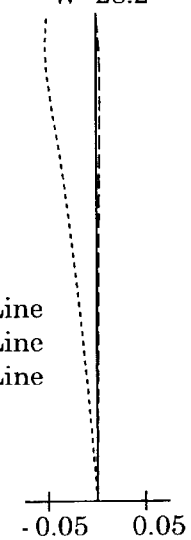
Fig.10B
W=28.2
-0.05  0.05
LATERAL
CHROMATIC
ABERRATION
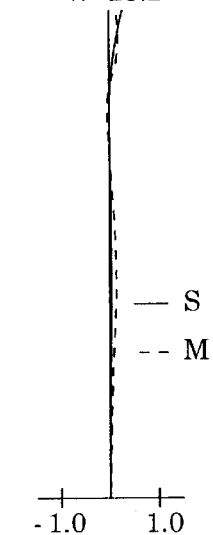
Fig.10C
W=28.2
——— S
- - M
-1.0  1.0
ASTIGMATISM
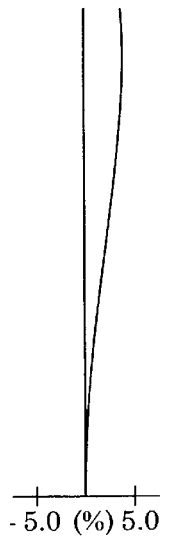
Fig.10D
W=28.2
-5.0 (%) 5.0
DISTORTION Fig.11A  Fig.11B  Fig.11C  Fig.11D
F_NO.=9.8   W=17.0   W=17.0   W=17.0
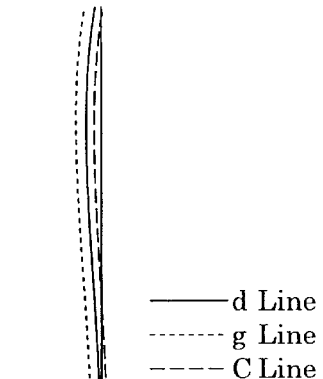
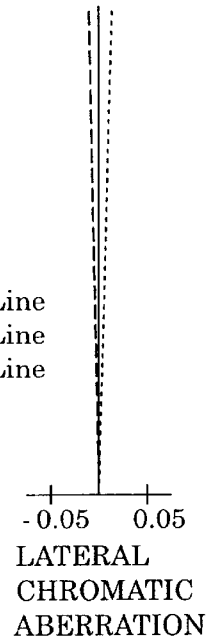
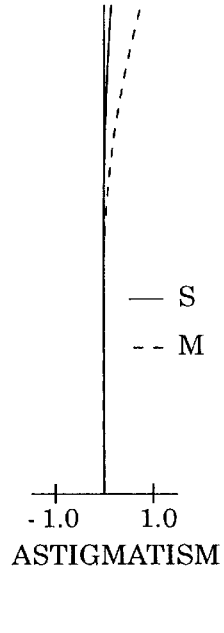
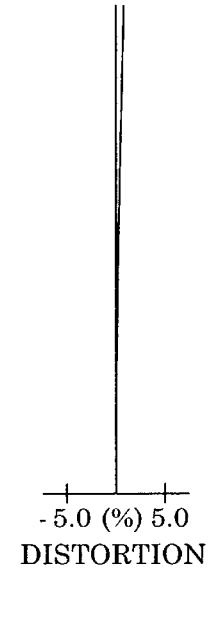
—— d Line
----- g Line
---- C Line
— S
-- M
-1.0  1.0       -0.05  0.05       -1.0  1.0       -5.0 (%) 5.0
SPHERICAL       LATERAL          ASTIGMATISM      DISTORTION
ABERRATION      CHROMATIC
                ABERRATION
CHROMATIC
ABERRATION
Fig.12A  Fig.12B  Fig.12C  Fig.12D
F_NO.=13.2   W=10.2   W=10.2   W=10.2
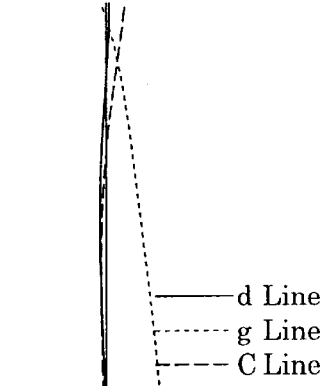
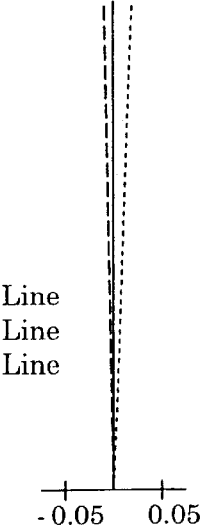
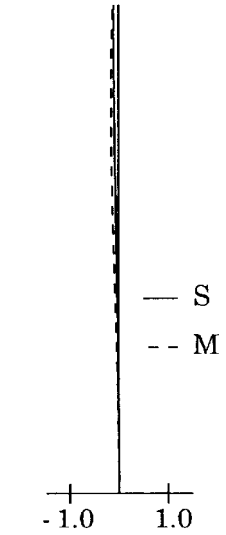
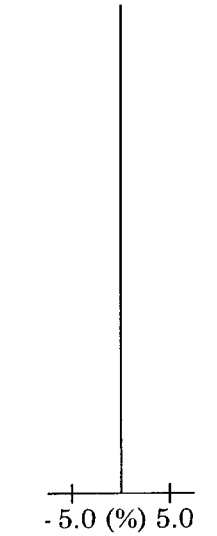
—— d Line
----- g Line
---- C Line
— S
-- M
-1.0  1.0       -0.05  0.05       -1.0  1.0       -5.0 (%) 5.0
SPHERICAL       LATERAL          ASTIGMATISM      DISTORTION
ABERRATION      CHROMATIC
                ABERRATION
CHROMATIC
ABERRATION

ZOOM LENS SYSTEM

BACKGROUND OF THE INVENTION

1. Field of the Invention

The present invention relates to a compact and two-lens-group zoom lens system having a short back focal distance, which is suitable for a lens shutter camera.

2. Description of the Prior Art

Unlike a zoom lens system for a single lens reflex camera which requires a space for a quick-return mirror behind the photographing lens system, a zoom lens system for a compact camera does not require a long back focal distance. Accordingly, as a zoom lens system for a lens shutter camera in which there is no need to prepare a space for a quick-return mirror, a telephoto-type lens system, which (i) includes a positive front lens group and a negative rear lens group, in this order from the object, and (ii) performs zooming by varying the distance between the front lens group and the rear lens group, is suitable for miniaturization of a compact camera.

One solution for increasing the zoom ratio of such a telephoto-type zoom lens system is to (i) secure the distance between the front lens group and the rear lens group as long as possible at the short focal length extremity, and (ii) increase the amount of change in the distance between the front lens group and the rear lens group.

However, a simple increase of the distance therebetween results in an increase of the diameter of each lens group. This is because the diameter of each lens group has to be made larger in order to secure peripheral illumination. Consequently, demands for miniaturization and weight reduction on the zoom lens system cannot be satisfied.

SUMMARY OF THE INVENTION

The present invention provides a miniaturized and low-cost zoom lens system having a zoom ratio of 3 or more; and more specifically, such a zoom lens system is materialized in a two-lens-group zoom lens system which is suitable for miniaturization and simplification of the structure thereof.

As an aspect of the present invention, there is provided a zoom lens system including a positive first lens group, and a negative second lens group, in this order from the object. Zooming is performed by moving the positive first lens group and the negative second lens group in an optical axis direction.

The positive first lens group includes a negative first lens element $1a$, a second lens element $1b$ having an aspherical surface on which the curvature is made smaller toward the periphery thereof, and a positive third lens element $1c$, in this order from the object.

The negative second lens group includes a positive fourth lens group $2a$ and a negative fifth lens group $2b$, in this order from the object.

The zoom lens system satisfies the following conditions:

$$-7 < f_T/f_{2G} < -4.5 \quad (1)$$

$$-9 < f_T/f_{2GN} < -7 \quad (2)$$

wherein $f_T$ designates the focal length of the entire zoom lens system at the long focal length extremity;

$f_{2G}$ designates the focal length of the negative second lens group, and $f_{2GN}$ designates the focal length of the negative fifth lens group $2b$ in the negative second lens group.

Note that in the negative second lens group, each of the positive fourth lens group $2a$ and a negative fifth lens group $2b$ can be constituted by a single lens element or more than two lens elements, while the positive first lens group includes the three lens elements. However, from the viewpoint of costs, it is preferable that each of the positive fourth lens group $2a$ and a negative fifth lens group $2b$ be constituted by a single lens element.

The zoom lens system preferably satisfies the following condition:

$$4 < f_T/f_{1G} < 6 \quad (3)$$

wherein $f_{1G}$ designates the focal length of the positive first lens group.

The zoom lens system can satisfy the following condition:

$$2 < f_T/f_{2GP} < 4 \quad (4)$$

wherein $f_{2GP}$ designates the focal length of the positive fourth lens group $2a$ in the negative second lens group.

The zoom lens system can further satisfy the following condition:

$$-5 < f_W/r_1 < 0 \quad (5)$$

wherein $f_W$ designates the focal length of the entire zoom lens system at the short focal length extremity, and $r_1$ designates the radius of curvature of the object-side surface of the negative first lens element 1a in the positive first lens group.

The zoom lens system preferably satisfies the following condition:

$$1.75 < Nd_{L1} \quad (6)$$

wherein $Nd_{L1}$ designates the refractive index, with respect to the d-line, of the negative first lens element 1a in the positive first lens group.

The zoom lens system preferably satisfies the following condition:

$$64 < \nu d \quad (7)$$

wherein $\nu d$ designates the Abbe number of the positive third lens element $1c$ in the positive first lens group.

In the positive first lens group, a lens element on which at least one aspherical surface is formed is provided, and the aspherical surface preferably satisfies the following condition:

$$-40 < \Delta I_{ASP} < -10 \quad (8)$$

wherein $\Delta I_{ASP}$ designates the amount of change of the spherical aberration coefficient due to the aspherical surface under the condition that the focal length at the short focal length extremity is converted to 1.0.

In the negative second lens group, a lens element on which at least one aspherical surface is formed is provided, and the aspherical surface preferably satisfies the following condition:

$$0 < \Delta V_{ASP} < 0.5 \quad (9)$$

wherein $\Delta V_{ASP}$ designates the amount of change of the distortion coefficient due to the aspherical surface under the condition that the focal length at the short focal length extremity is converted to 1.0.

The present disclosure relates to subject matter contained in Japanese Patent Application No. 2001-262753 (filed on Aug. 31, 2001) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of a zoom lens system at the short focal length extremity, according to a first embodiment of the present invention;

FIGS. 2A, 2B, 2C and 2D show aberrations occurred in the lens arrangement shown in FIG. 1;

FIGS. 3A, 3B, 3C and 3D show aberrations occurred in the lens arrangement shown in FIG. 1 at an intermediate focal length;

FIGS. 4A, 4B, 4C and 4D show aberrations occurred in the lens arrangement shown in FIG. 1 at the long focal length extremity;

FIG. 5 is a lens arrangement of a zoom lens system at the short focal length extremity, according to a second embodiment of the present invention;

FIGS. 6A, 6B, 6C and 6D show aberrations occurred in the lens arrangement shown in FIG. 5;

FIG. 9 is a lens arrangement of a zoom lens system at the short focal length extremity, according to a third embodiment of the present invention;

FIGS. 10A, 10B, 10C and 10D show aberrations occurred in the lens arrangement shown in FIG. 9;

FIGS. 11A, 11B, 11C and 11D show aberrations occurred in the lens arrangement shown in FIG. 9 at an intermediate focal length;

FIGS. 12A, 12B, 12C and 12D show aberrations occurred in the lens arrangement shown in FIG. 9 at the long focal length extremity;

DESCRIPTION OF THE PREFERRED EMBODIMENTS

Figure 7A:
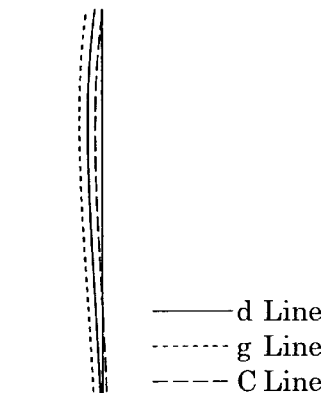
FIGS. 7A, 7B, 7C and 7D show aberrations occurred in the lens arrangement shown in FIG. 5 at an intermediate focal length.
Figure 7B:
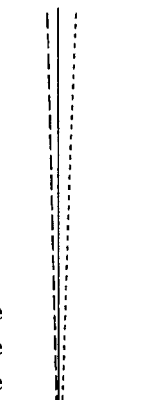
Figure 7C:
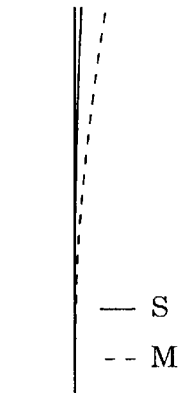
Figure 7D:
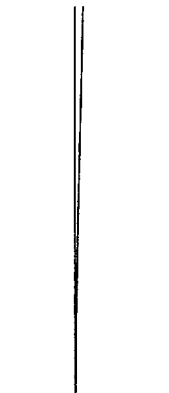
Figure 8A:
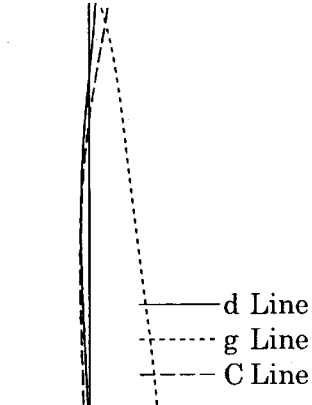
FIGS. 8A, 8B, 8C and 8D show aberrations occurred in the lens arrangement shown in FIG. 5 at the long focal length extremity.
Figure 8B:
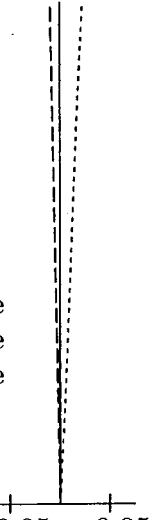
Figure 8C:
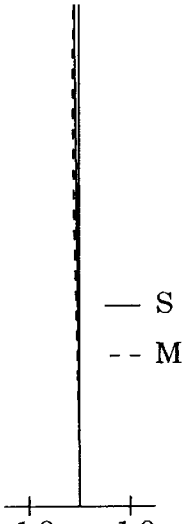
Figure 8D:
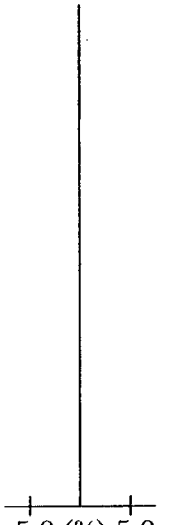
Figure 13:
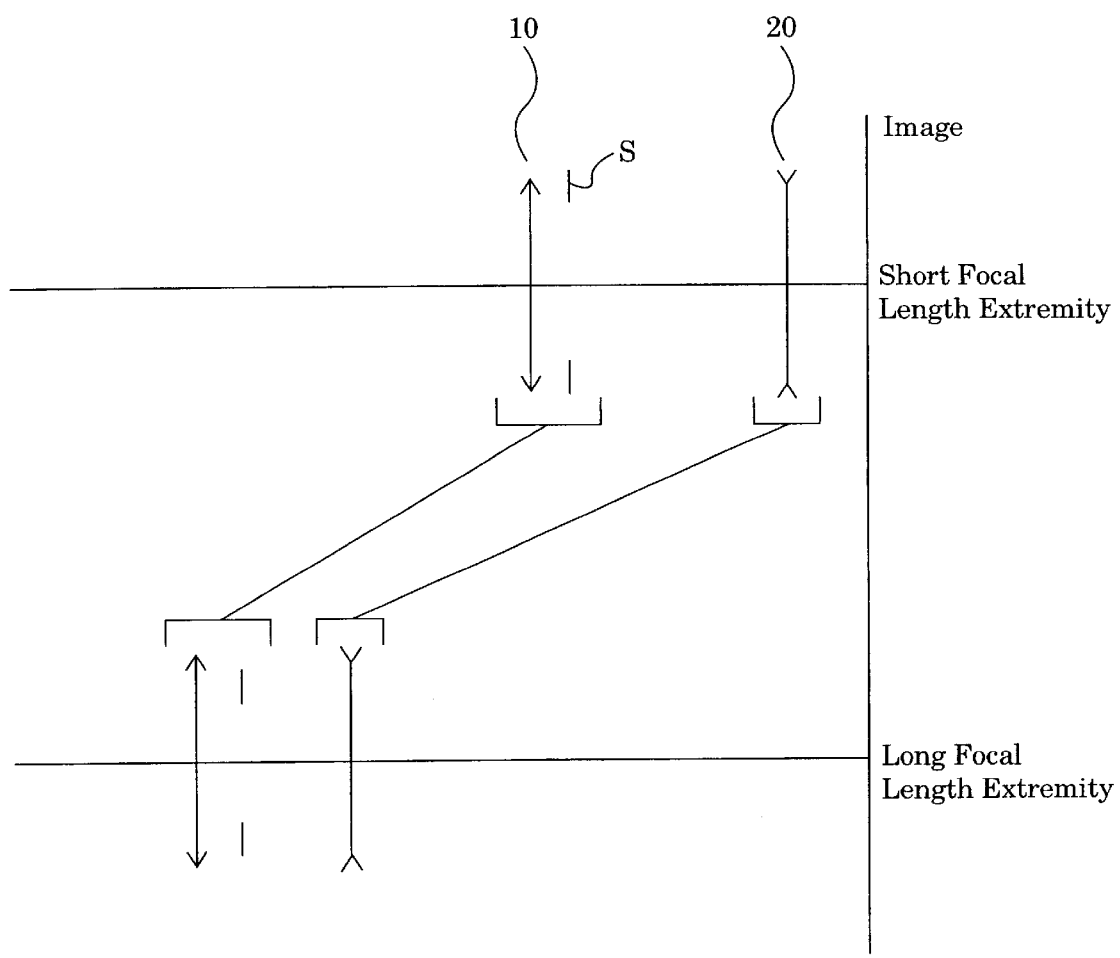
FIG. 13 shows a schematic lens-group moving paths of the zoom lens system according to the present invention.

In the zoom lens system of the present invention, as shown in the schematic lens-group moving paths of FIG. 13, includes a positive first lens group 10, a diaphragm S, and a negative second lens group 20, in this order from the object. Upon zooming from the short focal length extremity to the long focal length extremity, the positive first lens group 10 and the negative second lens group 20 monotonously move toward the object. The diaphragm S moves together with the positive first lens group 10. Focusing is carried out by moving the positive first lens group 10 while the diaphragm S remains stationary at the time of focusing.

As shown in the lens arrangement of each embodiment of FIGS. 1, 5 and 9, the positive first lens group 10 includes a negative 1a first lens element 11, a second 1b lens element 12 having an aspherical surface on which the curvature is made smaller toward the periphery of the second 1b lens element 12, and a positive 1c third lens element 13, in this order from the object. The negative second lens group 20 includes a positive 2a fourth lens group 21, and a negative 2b fifth lens group 22, in this order from the object. In the illustrated embodiments, each of the positive 2a fourth lens group 21 and the negative 2b fifth lens group 22 is constituted by a lens element.

Condition (1) specifies the power of the negative second lens group 20. By satisfying this condition, the traveling distance of the negative second lens group 20 can be made shorter, and miniaturization of the zoom lens system can be attained.

If $f_T/f_{2G}$ exceeds the upper limit of condition (1), the negative power of the negative second lens group 20 becomes weaker, so that the traveling distance of the negative second lens group 20 upon zooming becomes longer. As a result, the zoom lens system cannot be further miniaturized.

If $f_T/f_{2G}$ exceeds the lower limit of condition (1), the negative power of the negative second lens group 20 becomes too strong, so that the aberrations therein increase. Consequently, fluctuations of aberrations upon zooming become larger.

Condition (2) specifies the power of the negative 2b fifth lens group 22 of the negative second lens group 20. By satisfying this condition, the negative power of the negative 2b fifth lens group 22 can be determined adequately; and the traveling distance, a zoom ratio and aberrations can be balanced in the negative second lens group 20.

If $f_T/f_{2GN}$ exceeds the upper limit of condition (2), the negative power of the negative 2b fifth lens group 22 becomes weaker, and accordingly, the negative power of the negative second lens group 20 cannot be made sufficiently strong. Consequently, the traveling distance of the negative second lens group 20 becomes longer.

If $f_T/f_{2GN}$ exceeds the lower limit of condition (2), the negative power of the negative 2b fifth lens group 22 becomes too strong, so that aberrations occurred in the negative 2b fifth lens group 22 become larger. Moreover, the positive power of the positive 2a fourth lens group 21 also becomes stronger. Consequently, deterioration on aberrations due to errors, e.g., decentration, accumulated in assembling process becomes noticeable.

In the case where the zoom ratio exceeds 3.2, it is preferable that the power of the negative 2b fifth lens group 22 be set slightly stronger than a range determined by condition (2). More specifically, it is preferable that the upper limit of condition (2) be set to −7.3.

Condition (3) specifies the power of the positive first lens group 10. By satisfying this condition, the traveling distance of the positive first lens group 10 can be made shorter, and miniaturization of the zoom lens system can be attained.

If $f_T/f_{1G}$ exceeds the upper limit of condition (3), the positive power of the first lens group 10 becomes too strong, so that aberrations thereof become larger. Consequently, fluctuations of aberrations upon zooming increase.

If $f_T/f_{1G}$ exceeds the lower limit of condition (3), the power of the positive first lens group 10 becomes weaker, so that the traveling distance thereof becomes longer. As a result, miniaturization of the zoom lens system cannot be attained.

Condition (4) specifies the positive power of the positive 2a fourth lens group 21 of the negative second lens group 20.

By satisfying this condition, the negative power of the entire negative second lens group 20 can be balanced with the positive power of the positive 2a fourth lens group 21, so that aberrations occurred in the negative second lens group 20 can be reduced.

If $f_T/f_{2GP}$ exceeds the upper limit of condition (4), the positive power in the negative second lens group 20 becomes too strong. Consequently, the negative power of the negative second lens group 20 cannot be made stronger, or the negative 2b fifth lens group 22 has a strong negative power to the extent that the above strong positive power is canceled out. Accordingly, deterioration on optical performance due to errors, e.g., decentration, accumulated in assembling process becomes noticeable, and the zoom lens system is not suitable for a practical use.

If $f_T/f_{2GP}$ exceeds the lower limit of condition (4), the positive power in the second lens group 20 becomes weaker, so that aberrations occurred in the negative second lens group 20 become larger.

Condition (5) specifies the radius of curvature of the first surface (the most object-side surface) of the first lens element 11 (the most object-side lens element) of the positive first lens group 10. By forming the first surface as a divergent surface satisfying condition (5), the diameter of the front lens group (the first lens group 10) can be made smaller, while peripheral illumination can be secured sufficiently.

If $f_W/r_1$ exceeds the upper limit of condition (5), the first surface cannot be formed as a divergent surface, so that the diameter of the positive first lens group 10 increases in order to secure sufficient peripheral illumination.

If $f_W/r_1$ exceeds the lower limit of condition (5), the curvature of the divergent surface (first surface) becomes too large, so that it becomes difficult to correct aberrations which occur on the divergent surface.

Condition (6) specifies the refractive index, with respect to the d-line, of the negative 1a first lens element 11 of the positive first lens group 10. By satisfying this condition, (i) the radius of curvature of the first surface (divergent surface) can be prevented from being too small, (ii) machining of the negative 1a first lens element 11 can be made easily, and (iii) occurrence of aberrations on the first surface of the positive first lens group 10 can be reduced.

If $Nd_{L1}$ exceeds the lower limit of condition (6), the radius of curvature of the first surface of the positive first lens group 10 becomes smaller, so that manufacture of the negative 1a first lens element 11 becomes difficult.

Condition (7) specifies the Abbe number of the positive 1c third lens element 13 of the positive first lens group 10. By satisfying this condition, chromatic aberrations on the side the long focal length can be corrected.

If vd exceeds the lower limit of condition (7), chromatic aberrations, in particular, on the side of the long focal length cannot be corrected.

In the positive first lens group 10, it is preferable that a lens element having at least one aspherical surface satisfying condition (8) be appropriately utilized. By satisfying this condition, the number of lens elements of the positive first lens group 10 can be reduced, and spherical aberration, in particular, at the long focal length extremity can be corrected.

If $\Delta I_{ASP}$ exceeds the upper limit of condition (8), the effect of the correcting of spherical aberration by the aspherical surface becomes smaller, so that the correcting of spherical aberration cannot be made sufficiently.

If $\Delta I_{ASP}$ exceeds the lower limit of condition (8), the amount of asphericity increases, so that manufacture of the lens element with the aspherical surface becomes difficult.

In the negative second lens group 20, it is preferable that a lens element having at least one aspherical surface satisfying condition (9) be appropriately utilized. By satisfying this condition, the number of lens elements of the negative second lens group 20 can be reduced, and distortion, in particular, at the short focal length extremity can be corrected.

If $\Delta V_{ASP}$ exceeds the upper limit of condition (9), the amount of asphericity increases, so that manufacture of the lens element with the aspherical surface becomes difficult.

If $\Delta V_{ASP}$ exceeds the lower limit of condition (9), the effect of the correcting of distortion by the aspherical surface becomes smaller, so that the correcting of distortion cannot be made sufficiently.

The following relationships exists between the aspherical surface coefficients and the aberration coefficients.

1. The shape of an aspherical surface is defined as follows:

$$x = cy^2/(1+[1-\{1+K\}c^2y^2]^{1/2}) + A4y^4 + A6y^6 + A8y^8 + A10y^{10} \ldots$$

wherein:
x designates a distance from a tangent plane of an aspherical vertex;
y designates a distance from the optical axis;
c designates a curvature of the aspherical vertex (1/r),
K designates a conic constant;

2. In this equation, to obtain the aberration coefficients, the following substitution is made to replace K with "0" (Bi=Ai when K=0).

$$B4 = A4 + Kc^3/8;$$

$$B6 = A6 + (K^2 + 2K)c^5/16;$$

$$B8 = A8 + 5(K^3 + 3K^2 + 3K)c^7/128$$

$$B10 = A10 + 7(K^4 + 4K^3 + 6K^2 + 4K)c^9/256;$$

and therefore, the following equation is obtained:

$$x = cy^2/[1+[1-c^2y^2]^{1/2}] + B4y^4 + B6y^6 + B8y^8 + B10y^{10} + \ldots$$

3. Furthermore, in order to normalize the focal length f to 1.0, the followings are considered:

$$X = x/f; \ Y = y/f; \ C = f*c;$$

$$\alpha4 = f^3 B4; \ \alpha6 = f^5 B6; \ \alpha8 = f^7 B8; \ \alpha10 = f^9 B10$$

Accordingly, the following equation is obtained.

$$X = CY^2/[1+[1-c^2y^2]^{1/2}] + \alpha4Y^4 + \alpha6Y^6 + \alpha8Y^8 + \alpha10Y^{10} + \ldots$$

4. $\Phi = 8(N'-N)\alpha4$ is defined, and the third aberration coefficients are defined as follows:
I designates the spherical aberration coefficient;
II designates the coma coefficient;
III designates the astigmatism coefficient;
IV designates the curvature coefficient of the sagittal image surface; and
V designates a distortion coefficient; and therefore, the influence of the fourth-order aspherical-surface coefficient ($\alpha4$) on each aberration coefficient is defined as:

$\Delta I = h^4 \Phi$ $\Delta II = h^3 k \Phi$ $\Delta III = h^2 k^2 \Phi$ $\Delta IV=h^2k^2\Phi$ $\Delta V=hk^3\Phi$ wherein h1 designates the height at which a paraxial axial light ray strikes the first surface of the lens system including the aspherical surface;

h designates the height at which the paraxial axial light ray strikes the aspherical surface when the height h1 is 1;

k1 designates the height at which a paraxial off-axis ray, passing through the center of the entrance pupil, strikes the first surface of the lens system including the aspherical surface;

k designates the height at which the paraxial off-axis light ray strikes the aspherical surface when the height k1 is −1;

N' designates the refractive index of a medium on the side of the image with respect to the aspherical surface; and N designates the refractive index of a medium on the side of the object with respect to the aspherical surface.

Specific numerical data of the embodiments will be described hereinafter. In the diagrams of chromatic aberration represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, $F_{NO}$ designates the f-number, f designates the focal length of the entire zoom lens system, $f_B$ designates the back focal distance, W designates the half angle-of-view (°), r designates the radius of curvature, d designates the lens-element thickness or distance between lens elements, $N_d$ designates the refractive index of the d-line, and $v_d$ designates the Abbe number.

Embodiment 1

FIG. 1 is a lens arrangement of a zoom lens system at the short focal length extremity, according to the first embodiment of the present invention. FIGS. 2A through 2D show aberrations occurred in the lens arrangement shown in FIG. 1. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. Table 1 shows the numerical values of the first embodiment.

The positive first lens group 10 includes a negative meniscus lens element 11 (a negative first lens element 1a) having the concave surface facing toward the object, a positive meniscus lens element 12 (a second lens element 1b) having the convex surface facing toward the object, and a biconvex lens element 13 (a positive third lens element 1c), in this order from the object.

The negative second lens group 20 includes a positive meniscus lens element 21 (a positive fourth lens group 2a) having the convex surface facing toward the image, and a negative meniscus lens element 22 (a negative fifth lens group 2b) having the concave surface facing toward the object, in this order from the object.

The object-side surface (surface No. 3) of the positive meniscus lens element 12 is formed as an aspherical surface on which the curvature becomes smaller toward the periphery thereof with respect to the paraxial spherical surface.

The object-side surface (surface No. 7) of the positive meniscus lens element 21 is formed as an aspherical surface on which the curvature becomes smaller toward the peripheral periphery thereof with respect to the paraxial spherical surface.

A diaphragm S is provided 2.00 behind (image side) the first lens group 10 (surface No.6).

TABLE 1

$F_{NO} = 1:5.6–9.8–13.2$
$f = 39.00–70.00–120.00$ (Zoom Ratio = 3.08)
$f_B = 10.65–38.58–83.61$
$W = 28.2\quad 17.0\quad 10.2$

| Surface No. | r | d | $N_d$ | $v_d$ |
|---|---|---|---|---|
| 1 | −19.112 | 1.40 | 1.84666 | 23.8 |
| 2 | −28.968 | 0.50 | — | — |
| 3* | 22.951 | 1.80 | 1.58547 | 29.9 |
| 4 | 23.404 | 3.66 | — | — |
| 5 | 39.008 | 3.80 | 1.48749 | 70.2 |
| 6 | −14.441 | 15.43–7.74–3.71 | — | — |
| 7* | −56.667 | 3.03 | 1.58547 | 29.9 |
| 8 | −19.864 | 3.66 | — | — |
| 9 | −10.271 | 1.40 | 1.83481 | 42.7 |
| 10 | −49.266 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | −0.78817 × 10⁻⁴ | −0.72157 × 10⁻⁶ | 0.00 |
| 7 | 0.00 | 0.59323 × 10⁻⁴ | 0.48076 × 10⁻⁶ | 0.16706 × 10⁻⁸ |

Embodiment 2

FIG. 5 is a lens arrangement of a zoom lens system at the short focal length extremity, according to the second embodiment of the present invention. FIGS. 6A through 6D show aberrations occurred in the lens arrangement shown in FIG. 5. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows the numerical values of the second embodiment. The basic lens arrangement of the second embodiment is the same as the first embodiment. A diaphragm S is provided 2.00 behind (image side) the first lens group 10 (surface No.6).

TABLE 2

$F_{NO} = 1:5.6–9.8–13.2$
$f = 39.00–70.00–120.00$ (Zoom Ratio = 3.08)
$f_B = 10.43–38.40–83.53$
$W = 28.2\quad 17.0\quad 10.2$

| Surface No. | r | d | $N_d$ | $v_d$ |
|---|---|---|---|---|
| 1 | −18.684 | 1.40 | 1.80518 | 25.4 |
| 2 | −30.782 | 0.50 | — | — |
| 3* | 22.158 | 1.80 | 1.58547 | 29.9 |
| 4 | 23.291 | 3.19 | — | — |
| 5 | 37.346 | 3.80 | 1.48749 | 70.2 |
| 6 | −14.291 | 15.70–7.93–3.85 | — | — |
| 7* | −50.155 | 3.03 | 1.58547 | 29.9 |
| 8 | −19.499 | 3.74 | — | — |
| 9 | −10.122 | 1.40 | 1.83481 | 42.7 |
| 10 | −43.362 | — | — | — |

TABLE 2-continued $F_{NO} = 1:5.6$–$9.8$–$13.2$
$f = 39.00$–$70.00$–$120.00$ (Zoom Ratio = 3.08)
$f_B = 10.43$–$38.40$–$83.53$
W = 28.2    17.0    10.2

| Surface No. | r | d | $N_d$ | $v_d$ |
|---|---|---|---|---|

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | −0.81129 × 10⁻⁴ | −0.57276 × 10⁻⁶ | 0.00 |
| 7 | 0.00 | 0.59482 × 10⁻⁴ | 0.58776 × 10⁻⁶ | 0.11987 × 10⁻⁸ |

Embodiment 3

FIG. 9 is a lens arrangement of a zoom lens system at the short focal length extremity, according to the third embodiment of the present invention. FIGS. 10A through 10D show aberrations occurred in the lens arrangement shown in FIG. 9. FIGS. 11A through 11D show aberrations occurred in the lens arrangement shown in FIG. 9 at an intermediate focal length. FIGS. 12A through 12D show aberrations occurred in the lens arrangement shown in FIG. 9 at the long focal length extremity. Table 3 shows the numerical values of the third embodiment. The basic lens arrangement of the third embodiment is the same as the first embodiment. A diaphragm S is provided 2.00 behind (image side) the first lens group 10 (surface No. 6).

TABLE 3

$F_{NO} = 1:5.6$–$9.8$–$13.2$
$f = 39.00$–$70.00$–$120.00$ (Zoom Ratio = 3.08)
$f_B = 10.35$–$38.36$–$83.53$
W = 28.2    17.0    10.2

| Surface No. | r | d | $N_d$ | $v_d$ |
|---|---|---|---|---|
| 1 | −18.679 | 1.40 | 1.78472 | 25.7 |
| 2 | −32.306 | 0.50 | — | — |
| 3* | 21.881 | 1.80 | 1.58547 | 29.9 |
| 4 | 23.653 | 3.07 | — | — |
| 5 | 40.236 | 3.80 | 1.48749 | 70.2 |
| 6 | −14.002 | 16.08–8.16–4.01 | — | — |
| 7* | −51.462 | 3.03 | 1.58547 | 29.9 |
| 8* | −18.870 | 3.62 | — | — |
| 9 | −10.201 | 1.40 | 1.83481 | 42.7 |
| 10 | −47.512 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | −0.83115 × 10⁻⁴ | −0.82263 × 10⁻⁶ | 0.00 |
| 7 | 0.00 | 0.34835 × 10⁻⁴ | 0.80431 × 10⁻⁶ | 0.48401 × 10⁻⁹ |
| 8 | 0.00 | −0.21389 × 10⁻⁴ | 0.12947 × 10⁻⁶ | 0.00 |

The numerical values of each condition of each embodiment are shown in Table 4.

TABLE 4

| | Embodiment 1 | Embodiment 2 | Embodiment 3 |
|---|---|---|---|
| Condition (1) | −4.86 | −4.83 | −4.80 |
| Condition (2) | −7.59 | −7.44 | −7.76 |
| Condition (3) | 4.38 | 4.36 | 4.36 |
| Condition (4) | 2.37 | 2.28 | 2.55 |
| Condition (5) | −2.0 | −2.1 | −2.1 |
| Condition (6) | 1.847 | 1.805 | 1.785 |
| Condition (7) | 70.21 | 70.21 | 70.21 |
| Condition (8) | −25.68 | −26.52 | −27.16 |
| Condition (9) | 0.34 | 0.36 | 0.41 |

According to the above description, a miniaturized and low-cost zoom lens system having a zoom ratio of 3 or more can be obtained. Furthermore, the zoom lens system can be materialized in a two-lens-group zoom lens system which is suitable for miniaturization and simplification of the structure thereof.

What is claimed is:

1. A zoom lens system comprising a positive first lens group, and a negative second lens group, in this order from an object, wherein zooming is performed by moving said positive first lens group and said negative second lens group in an optical axis direction;

wherein said positive first lens group comprises a negative first lens element, a second lens element having an aspherical surface on which the curvature becomes smaller toward the periphery thereof, and a positive third lens element, in this order from said object;

wherein said negative second lens group comprises a positive fourth lens group and a negative fifth lens group, in this order from said object; and wherein said zoom lens system satisfies the following conditions:

$$-7 < f_T/f_{2G} < -4.5$$

$$-9 < f_T/f_{2GN} < -7$$

wherein $f_T$ designates the focal length of the entire zoom lens system at the long focal length extremity;

$f_{2G}$ designates the focal length of said negative second lens group, and $f_{2GN}$ designates the focal length of said negative fifth lens group in said negative second lens group.

2. The zoom lens system according to claim 1, satisfying the following condition:

$$4 < f_T/f_{1G} < 6$$

wherein $f_{1G}$ designates the focal length of said positive first lens group.

3. The zoom lens system according to claim 1, satisfying the following condition:

$$2 < f_T/f_{2GP} < 4$$

wherein $f_{2GP}$ designates the focal length of said positive fourth lens group in said negative second lens group.

4. The zoom lens system according to claim 1, satisfying the following condition:

$$-5 < f_W/r_1 < 0$$

wherein $f_W$ designates the focal length of the entire zoom lens system at the short focal length extremity, and $r_1$ designates the radius of curvature of the object-side surface of said negative first lens element in said positive first lens group.

5. The zoom lens system according to claim 1, satisfying the following condition:

$$Nd_{L1} > 1.75$$

wherein $Nd_{L1}$ designates the refractive index, with respect to the d-line, of said negative first lens element in said positive first lens group.

6. The zoom lens system according to claim 1, satisfying the following condition:

$$\nu d > 64$$

wherein $\nu d$ designates the Abbe number of said positive third lens element in said positive first lens group.

7. The zoom lens system according to claim 1, wherein said aspherical surface formed on said second lens element satisfies the following condition:

$$-40 < \Delta I_{ASP} < -10$$

wherein $\Delta I_{ASP}$ designates the amount of change of the spherical aberration coefficient due to the aspherical surface under the condition that the focal length at the short focal length extremity is converted to 1.0.

8. The zoom lens system according to claim 1, wherein said negative second lens group comprises a lens element on which at least one aspherical surface is formed, and said aspherical surface satisfies the following condition:

$$0 < \Delta V_{ASP} < 0.5$$

wherein $\Delta V_{ASP}$ designates the amount of change of the distortion coefficient due to the aspherical surface under the condition that the focal length at the short focal length extremity is converted to 1.0.

9. The zoom lens system according to claim 1, wherein each of said positive fourth lens group and said negative fifth lens group comprises a single lens element.

* * * * *